(12) United States Patent
Tuscano et al.

(10) Patent No.: US 9,769,791 B2
(45) Date of Patent: Sep. 19, 2017

(54) SYSTEM AND METHOD FOR SHARING MOBILE VIDEO AND AUDIO CONTENT

(71) Applicant: Alively, Inc., Marina del Ray, CA (US)

(72) Inventors: Vincent Tuscano, Santa Monica, CA (US); Raymond Lee, Los Angeles, CA (US); Vadim Lavrusik, San Mateo, CA (US)

(73) Assignee: Alively, Inc., Marina del Ray, CA (US)

( * ) Notice: Subject to any disclaimer, the term of this patent is extended or adjusted under 35 U.S.C. 154(b) by 0 days.

(21) Appl. No.: 15/257,407

(22) Filed: Sep. 6, 2016

(65) Prior Publication Data

US 2017/0070302 A1    Mar. 9, 2017

Related U.S. Application Data

(60) Provisional application No. 62/259,359, filed on Nov. 24, 2015, provisional application No. 62/214,300, filed on Sep. 4, 2015.

(51) Int. Cl.
| | |
|---|---|
| H04W 68/00 | (2009.01) |
| H04L 29/08 | (2006.01) |
| H04L 12/801 | (2013.01) |
| H04L 12/863 | (2013.01) |
| H04H 20/04 | (2008.01) |

(52) U.S. Cl.
CPC .......... *H04W 68/005* (2013.01); *H04H 20/04* (2013.01); *H04L 47/29* (2013.01); *H04L 47/50* (2013.01); *H04L 67/06* (2013.01)

(58) Field of Classification Search
None
See application file for complete search history.

(56) References Cited

U.S. PATENT DOCUMENTS

| | | | | |
|---|---|---|---|---|
| 8,667,075 | B1* | 3/2014 | King ................. | H04N 21/2187 709/206 |
| 2003/0163824 | A1* | 8/2003 | Gordon ............... | H04N 21/231 725/90 |
| 2006/0129627 | A1* | 6/2006 | Phillips ................. | H04L 63/10 709/200 |
| 2009/0254926 | A1* | 10/2009 | Kim ....................... | G06F 9/465 719/328 |
| 2010/0023579 | A1* | 1/2010 | Chapweske ........ | H04N 7/17336 709/203 |
| 2013/0046857 | A1* | 2/2013 | Howe .................. | H04L 65/4069 709/219 |
| 2014/0181882 | A1* | 6/2014 | Denoual ............. | H04N 21/8133 725/116 |
| 2015/0089023 | A1* | 3/2015 | Phillips ............... | H04L 65/4084 709/219 |
| 2016/0057472 | A1* | 2/2016 | Gupta ................. | G06Q 30/0235 725/14 |
| 2016/0124596 | A1* | 5/2016 | Doerring .............. | G06F 3/0484 715/723 |

* cited by examiner

*Primary Examiner* — Xavier Szewai Wong
(74) *Attorney, Agent, or Firm* — Wilmer Cutler Pickering Hale and Dorr LLP

(57) ABSTRACT

Systems and methods for broadcasting media content include recording the media content by a mobile device and monitoring the recording to determine whether a threshold has been reached. The recorded content is segmented into chunks that can be encoded, compressed, and uploaded to a server for broadcasting to a specified list of recipients. The recorded chunks can be deleted from the mobile device once a confirmation is received from the server that the chunk was received.

20 Claims, 6 Drawing Sheets

SYSTEM AND METHOD FOR SHARING MOBILE VIDEO AND AUDIO CONTENT

CROSS-REFERENCE TO RELATED APPLICATIONS

This application claims the benefit under 35 U.S.C. §119(e) to U.S. Provisional Application No. 62/214,300, entitled "SYSTEM AND METHOD FOR MOBILE VIDEO AND AUDIO CONTENT BROADCAST IN NETWORKS WITH NON-CONTIGUOUS CONNECTIONS," filed on Sep. 4, 2015, and to U.S. Provisional Application No. 62/259,359, entitled "SYSTEM AND METHOD FOR COMPRESSING AND SHARING MOBILE VIDEO AND AUDIO CONTENT," filed on Nov. 24, 2015, the contents of both applications are incorporated by reference herein in their entirety.

FIELD OF THE INVENTION

The present invention relates to systems and methods for broadcasting compressed video and audio content from a mobile device.

BACKGROUND OF THE INVENTION

Broadcasting video and/or audio content originating from a mobile device has many challenges. For example, cellular and Wi-Fi networks are not always and continuously reliable. Most applications and devices that record and/or stream media files use standard protocols, which result in capturing continuous streams of data. When a mobile device attempts to broadcast or transmit video and/or audio files, which are large and require long transmit times, network connection problems can result in failed streams, unacceptable latency, and interrupted user experience.

Because the media files captured by mobile device are large, the file size and bandwidth of the streamed media file are subject to resolution quality and recorded length. For example, a two minute video at a 720p resolution can absorb about 250 MB of space and a thirty minute video at a 480p resolution can absorb about 3 GB of space.

SUMMARY OF THE INVENTION

A method for broadcasting media content from a mobile device can include the steps of recording the media content, monitoring, by the mobile device, the recording of the media content to determine whether a threshold has been reached, and segmenting the recorded content into at least one chunk, when the threshold has been reached. The method can also include determining to encode the at least one chunk, and encoding, by the mobile device, the at least one chunk, when the mobile device determines to encode the at least one chunk. The method can also include compressing the at least one chunk and placing the at least one compressed chunk into an upload queue. The method can also include transmitting, by the mobile, to a server the at least one chunk from the upload queue, receiving, by the mobile device, from the server a confirmation that the at least one transmitted chunk has been successfully received by the server, and deleting the at least one transmitted chunk from the mobile device, after receiving the confirmation from the server.

According to other embodiments, a method for delivering media content recorded on a mobile device can include the steps of receiving, by a server, from a first mobile device at least one encoded chunk of a media content recording, receiving, by the server, from the first mobile device metadata associated with the at least one encoded chunk of a media content recording, and transmitting to the first mobile device a confirmation that the at least one encoded chunk has been successfully received by the server. The method can also include storing the metadata to a database in communication to the server, notifying, by the server, at least one recipient of the media content that new media content is available, and storing, by the server, the at least one chunk to at least one of a content delivery network (CDN) or a streaming service.

According to other embodiments, a method for delivering media content recorded on a mobile device can include the steps of receiving, by a server, from a first mobile device at least one encoded chunk of a media content recording, receiving, by the server, from the first mobile device metadata associated with the at least one encoded chunk of a media content recording, and transmitting to the first mobile device a confirmation that the at least one encoded chunk has been successfully received by the server. The method can also include storing the metadata to a database in communication to the server, notifying, by the server, at least one recipient of the media content that new media content is available, reconstructing the media content from the at least one chunks, and storing the reconstructed media content to at least one of a CDN or a streaming service.

DETAILED DESCRIPTION

The present invention is directed to systems and methods for broadcasting, recording, and/or sharing a mobile video and/or audio content in environments without a continuous network connection. A mobile device user can capture, stream and share uninterrupted video or audio content to a selected audience using segmented files instead of standard streaming protocols. According to aspects of the disclosure, the audience can choose to either stream the broadcasted video or audio content or view the content on demand. The disclosed systems and methods can support adaptive bitrate switching protocols for desktop, laptop and mobile devices.

Most providers of streaming video/audio content support live or real-time broadcasting of video/audio with standard streaming protocols, for example, Periscope, Meerkat, UStream, LiveStream. Real-time video and audio broadcasting can create various issues for the broadcasters and the viewers of the broadcasted content. For example, a broadcaster is required to have a strong network connection throughout the entire broadcast to avoid failed steams, constant buffering, and large latency, and to provide uninterrupted video for the viewers. Frequently, the video or audio quality is severely compromised, at least in parts of the broadcast, because of its dependency on a continuous network connection with standard streaming protocols. As a result, the resolution of a broadcasted video is reduced to compensate for poor bandwidth. These problems are even more noticeable when the broadcaster is a mobile device user, because, in many situations, the broadcast originates at a venue, e.g., concert, that has poor network connection, there is interference from the venue structure, and cell congestion because of other mobile device users.

The disclosed systems and methods can remove the dependency to have a continuous network connection and can eliminate buffering in its entirety when broadcasting a high-quality video to viewers. According to aspects of the disclosure, the disclosed systems and methods use segmented files to capture blocks of the video or audio content and then send the segmented files upstream to a server for an uninterrupted delivery to the audience. The disclosed methods do not depend on standard streaming protocols and systems, and, therefore can guarantee delivery of higher quality content since there is no longer a dependency on a continuously reliable network. Accordingly, the disclosed systems and methods can guarantee that the content is delivered without data loss.

Figure 1:
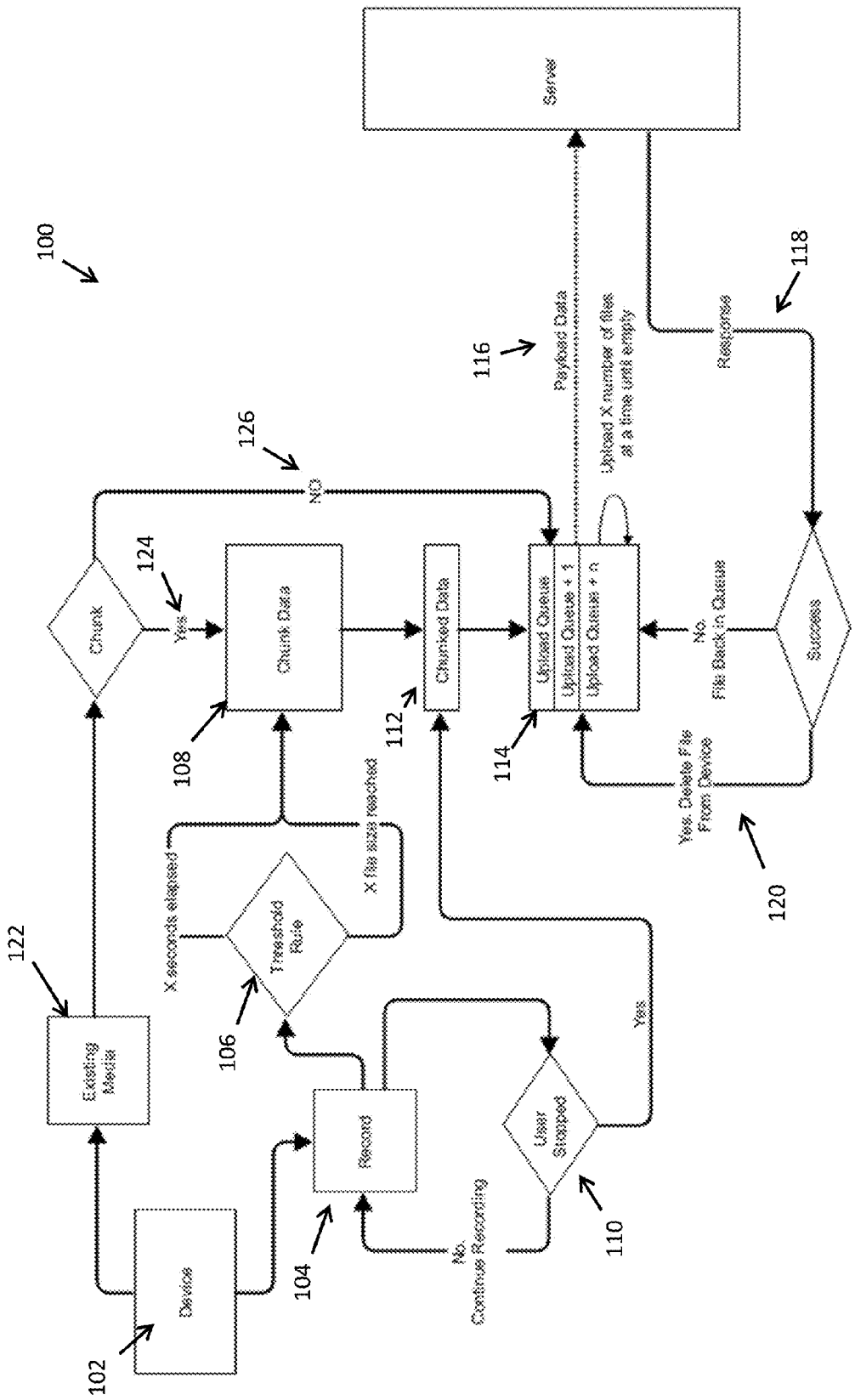
FIG. 1 shows an exemplary method for broadcasting mobile video and audio content in a network with non-contiguous connection, according to aspects of the invention.

FIG. 1 shows an exemplary method 100 for broadcasting mobile video and audio content in a network with non-contiguous connection. A mobile device user can initiate a recording of media 102, for example, using a video or audio recording application on the mobile device. The media can be recorded in a mobile device memory 104. The disclosed method can check whether a threshold rule has been met 106, for example, whether a particular number of seconds has passed or whether a particular number of bytes has been processed. The recorded data can be stored in the mobile device or can be stored to media connected to the mobile device, such as an external drive. A timer can count the number of seconds that the mobile device has been recording and can segment the recording into chunks. The timer can reset and restart counting every time the recording has been segmented. Alternatively, the disclosed methods can check the memory space accumulated since the previous threshold was reached to determine when the next threshold is reached. When the threshold rule is met, the method can segment the recorded media into chunks 108. According to aspects of the disclosure, the threshold can be a variable threshold and can be changed dynamically. For example, the threshold can be set based on existing network conditions. Alternatively, the threshold can be set by the mobile device user. The method continuously checks whether the user has stopped recording 110. There is an iterative process that continues to generate chunks of data every time the threshold rule is met. When the user stops recording, the method collects all generated chunks 112, and then chunks are placed into an upload queue 114. The chunks are transmitted to the server 116. When a chunk is successfully received by the server, the server sends back a confirmation 118 to the mobile device. For example, the confirmation can be a successful REST Header response as well as a JSON object: {"status":1}. Once the confirmation is received by the mobile device, the chunk can be deleted from the mobile device 120. According to aspect of the invention, the chunk can be automatically deleted from the mobile device without any user interaction. The location of each chunk is known in the upload queue and can be removed after the receipt of the confirmation from the server.

According to aspects of the disclosure, before each chunk is transmitted to the server the chunk is compressed. For example, the chunks can be compressed into a video container that is represented, for example, by a .mov or mp4 format. The compression process can use a codec, such as the native H.264 codec. In addition, each chunk can be analyzed before being processed over a fixed or variable bitrate reduction. The disclosed method can also remove unnecessary data and artifacts. The results can be significant; for example, a 250 MB video file at a 720p resolution can be reduced to 80 MB (⅓ the size) and a 3 GB video file at 480p resolution can be reduced to 500 MB or ⅙ of the size while maintaining the same resolution output.

According to aspects of the disclosure, each chunk can have a number in sequential order with metadata. For example, when the first recording starts, a sequential number can be prepended to the name of the chunk, starting at digit "00000000000." This can then followed by incrementing the digits to the next number, e.g., "000000001" when a new chuck is generated. The mobile device can transmit the lower numbered chunks to the server before the higher numbered ones. If the server receives the chunks out of order, it can process the chunks, store them, and can wait for the lower numbered chunks to be processed so that the received chunks can be delivered in order.

According to aspects of the disclosure, the metadata can indicate which number in the sequence corresponds to the last chunk that the server should expect. Accordingly, the server can know when the final element has been received. For example, when the user ends their broadcast, a small REST request can be sent to the server to indicate that this session stops when a certain sequence number is received. In addition, metadata can be added to the data sent from the upload queue that can indicate to the server that the received chunk is the last chuck. The disclosed method can also provide checks that can inform the server that the broadcast is complete, even if the server has not received the final chunk of the recorded broadcast. This can be useful, for example, when the final chunk arrives at a later date, e.g., the next time the user opens the application on his cell phone or the mobile device is connected to a network. When the server receives the final chunk(s), it can append the final chunks to the ones already received.

According to aspects of the disclosure, the mobile device user may select to broadcast video and/or audio content that has already been recorded and is stored in the mobile device, for example in the mobile device's memory, or on media connected to the mobile device, for example, on an external hard drive 122. The method can determine whether the existing media will be segmented 124 before being uploaded into the upload queue, or whether the existing media will be uploaded in full 126.

Figure 2:
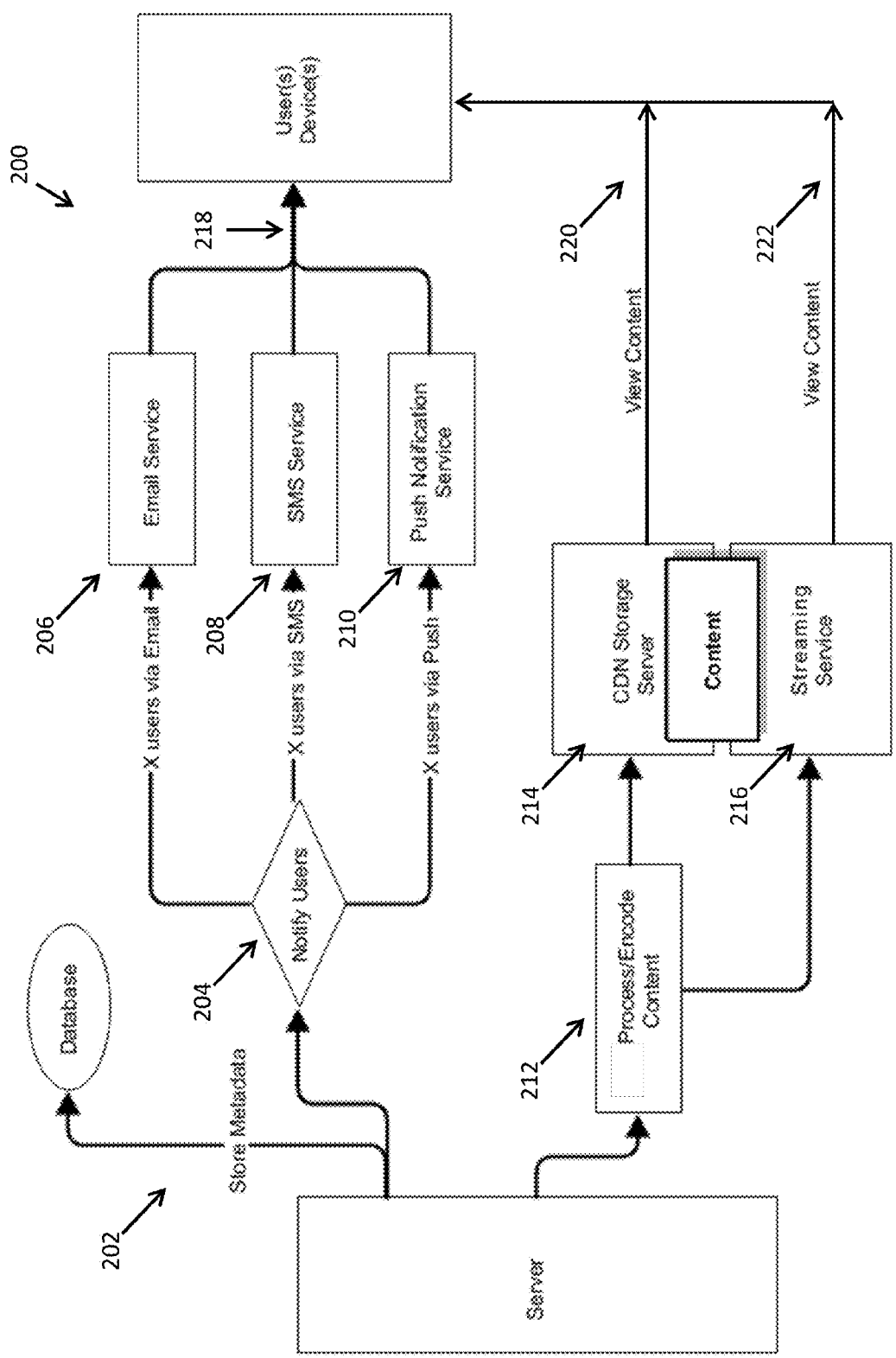
FIG. 2 shows an exemplary method for delivering broadcasted mobile video and audio content in a network with non-contiguous connection, according to aspects of the invention.

FIG. 2 shows an exemplary method 200 for delivering broadcasted mobile video and audio content to an audience, according to aspects of the invention. After the server receives the chunks, it can store the metadata of each chunk into a database 202. The server can also notify users that content is available 204. For example, the server can use an email service 206, an SMS service 208, or a Push notification service 210 to alert the user of new content. The server can also process and/or encode the received chunks 212, and store the content into a content delivery network (CDN) storage server 214 or a streaming service 216. Once the user receives a notification that content is available 218, the user can request access to the content. The recipient mobile device can receive the content from either the CDN storage server 220 or the steaming service 222.

According to aspects of the disclosure, the server can reconstruct the recording from its chunks before it is delivered or streamed to a target mobile device, for example using command line tools, such as FFmpeg that can perform various conversions. Alternatively, the content can be delivered or streamed to the target mobile device as chunks.

According to aspects of the disclosure, the chunks can be transmitted to the server before the user finishes recording of the content. Therefore, the target user can start receiving chunks from the CDN storage server or can stream the content from the streaming service even before the final chunk arrives at the server. As the chunks come in to the server, the method can detect the rate at which they come in, and accordingly deliver them to the target mobile device to achieve reduced latency. Therefore, a broadcast can continue for hours and the end user can watch as it is happening. The end user does not have to wait for the broadcast to finish to be viewed.

Figure 3:
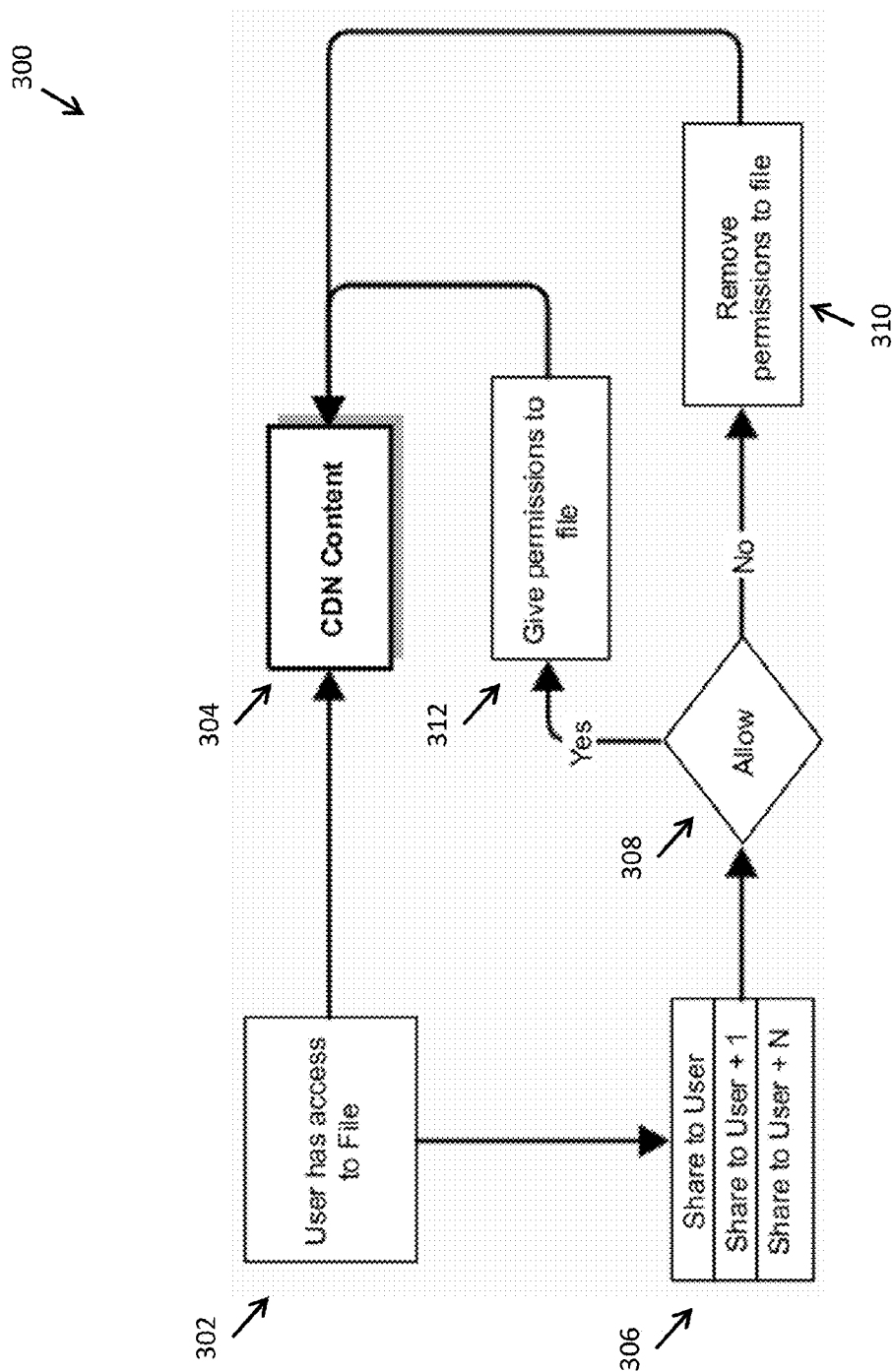
FIG. 3 shows an exemplary method for sharing mobile video and audio content in a network with non-contiguous connection, according to aspects of the invention.

FIG. 3 shows an exemplary method 300 for sharing mobile video and audio content in a network with non-contiguous connection, according to aspects of the invention. A content owner can have access to video and/or audio content, for example, a complete file or a chunk of a particular video and/or audio file 302. The user can upload the content to a CDN 304 and can also specify permissions to a list of other users 306. According to aspects of the disclosure, the disclosed methods and systems can check whether a particular user has access to the content 308. If the content owner has not allowed sharing of the content with a particular user, the method can remove permissions from the particular user 310. If the content owner has allowed sharing of the content, then the particular user is granted permissions to the content 312, for example, permission to download, stream, etc.

A mobile user has an average of 32-64 GB of storage capacity on their respective mobile devices. This capacity is often not enough for the content, e.g., videos, audio, photographs, generated by an average user. For example, a single 2-minute video can absorb 250 MB of space alone leading most users to quickly reach maximum storage capacity on their devices. Most users delete videos from their device to create available space, having to sacrifice personal moments to capture new ones. As a result, users can use cloud based storage services for purchase, such as Apple iCloud or Dropbox, to increase their storage capacity. However, it can be increasingly challenging to manage a cloud-based library or sharing video files with others users. For example, iCloud makes as a backup a copy of designated data on all devices registered to a particular user, and doesn't necessarily remove it from the device.

The disclosed systems and methods can automatically store the generated content in the cloud as an archive or library for all videos broadcasted, recorded or shared. As each chunk is successfully stored, that file can be removed from the user's device, therefore taking up as little space as possible on a user's device while being recorded. For example, a one-hour video broadcast can only use a maximum of 5 MB of memory. As the broadcast is recorded, it can be segmented into chunks that are uploaded to a server or a cloud service. When the chunks are successfully uploaded, they can be removed entirely upon completion. This process essentially means an endless amount of recording at a time regardless of memory space. Content is stored in the cloud and users need not manually delete content from their device as it is automatically removed and archived. This means that a phone loss or damage or software issues will not result in loss of content.

A typical user behavior when sharing a recorded video from a mobile device is to point and shoot and then attach the file to an SMS or Email Message and then identify the user(s) to share the video. A majority of users can run into file size issues when sending the file through traditional messaging systems, which will force the content creator to either trim the video or forego sending it entirely. The disclosed systems and methods solve the problem of sending large files, because the data is sent in chunks during the recording and/or after the recording. As a result, there are no limits to the length of the content to send.

Another problem with the above user behavior, is to identify all the recipients of the video in a message window before the moment is lost or forgotten. The disclosed systems and methods enable the broadcaster to pre-select viewers or a group of viewers, such as family, co-workers, etc., to access the video during its broadcast or access the video-on-demand through a shared network of archived videos. All videos broadcasted through the system can automatically be recorded and archived within a broadcaster's profile and accessible by anyone designed to share the video. Each recipient can view the content from the single source as opposed to receiving the media content in its entirety.

Figure 4:
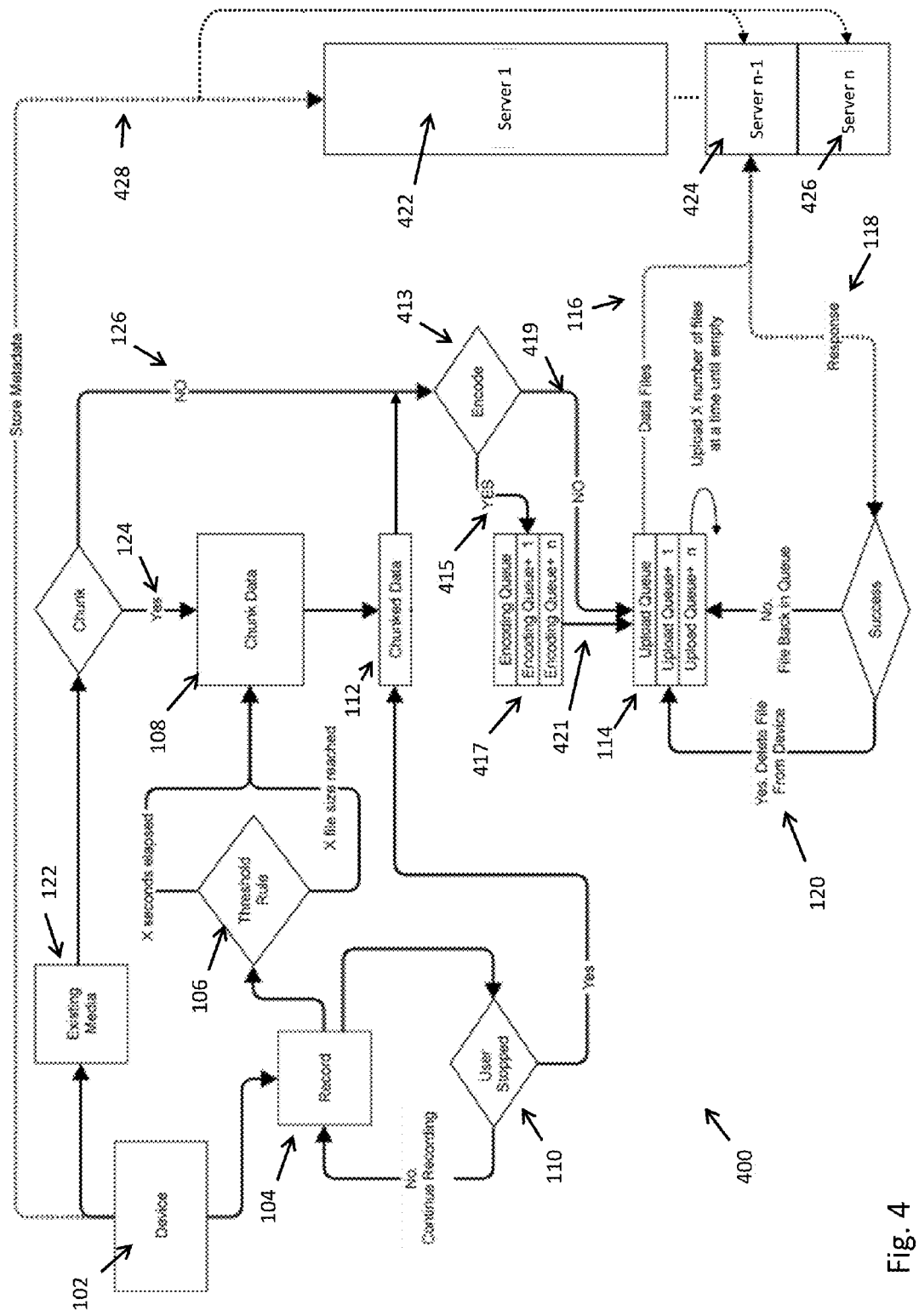
FIG. 4 shows an exemplary method for broadcasting mobile video and audio content in a network with non-contiguous connection, according to aspects of the invention.

According to alternative embodiments, FIG. 4 shows an exemplary method 400 for broadcasting mobile video and audio content in a network with non-contiguous connection. A mobile device user can initiate a recording of media, for example, using a video or audio recording application on the mobile device 102. The media can be recorded (104) in a mobile device memory or can be recorded to media connected to the mobile device, such as an external drive or memory. While the media is being recorded, the disclosed method can check whether a threshold rule has been met 106, for example, whether a particular number of seconds has passed or whether a particular number of bytes has been recorded and/or processed. For example, a timer can count the number of seconds that the mobile device has been recording and can segment the recording into chunks, once a time threshold is met. The timer can reset and restart counting every time the recording has been segmented into a new chunk. Alternatively, the disclosed methods can check the memory space accumulated, e.g., the size of the recording, since the previous threshold was reached to determine when the next threshold is reached. When the threshold rule is met, the method can segment the recorded media into chunks 108. According to aspects of the disclosure, the threshold can be a variable threshold and can be changed dynamically. For example, the threshold can be set based on existing network conditions or available connectivity to a network, e.g., when the network conditions are poor or when the mobile device is not connected to a reliable network, the recording can be segmented into relatively small chunks to ensure that when the chunks are uploaded, the uploading process does not get interrupted frequently. Alternatively, the threshold can be set by the mobile device user. The method continuously checks whether the user has stopped recording 110. According to embodiments, unless the user stops recording, there is an iterative process that continues to generate chunks of data every time the threshold rule is met.

When the user stops recording or after a predetermined delay since one or more chunks have been created, the method prepares the generated chunks for transmission 112. Specifically, the method determines whether to encode the data 413. If the method determines that the chunks will be encoded before transmission 415, the generated chunks enter an encoding queue, where they are encoded 417. According to embodiments, the encoding queue can use, for example, an Fast Forward Moving Picture Experts Group (FFMPEG) encoder, and/or can wrap the audio and video content in an MPEG-TS container with H.264 codec for video and Advanced Audio Coding (AAC) codec for audio. The final output of an encoding process can be a MPEG-TS file (.ts) suitable for HTTP Live Streaming (HLS) playback. The encoding queue can track the duration of each file and can build the appropriate m3u8 file for HLS playback. According to embodiments, the encoding queue can receive a variable number or a constant number of chunks for encoding at one time.

According to aspects of the disclosure, before each chunk is transmitted to the server the chunk can be compressed. For example, the chunks can be compressed into a video container that is represented, for example, by a .mov or mp4 format. The compression process can use a codec, such as the native H.264 codec. In addition, each chunk can be analyzed before being processed over a fixed or variable bitrate reduction. The disclosed method can also remove unnecessary data and artifacts. The results can be significant; for example, a 250 MB video file at a 720p resolution can be reduced to 80 MB (⅓ the size) and a 3 GB video file at 480p resolution can be reduced to 500 MB or ⅙ of the size while maintaining the same resolution output.

If the method determines that the chunks will not be encoded 419 or after the chunks have been encoded 421, the chunks can be placed into an upload queue 114. The chunks can then be transmitted to the server 116. According to embodiments, the chunks are transmitted to one of many servers (422, 424, 426), for example, the chunks are sent to the closest server relative to the user.

When a chunk is successfully received by the server, the server sends back a confirmation 118 to the mobile device. For example, the confirmation can be a successful REST Header response as well as a JSON object:{"status":1}. Once the confirmation is received by the mobile device, the chunk can be deleted from the mobile device 120. According to embodiments, the chunk can be automatically deleted from the mobile device without any user interaction. The location of each chunk in the upload queue can be know, and therefore, the chunk can be identified and can be removed after the receipt of the confirmation from the server.

Device 102 can also sent to the server metadata that are associated with the recorded content 428. For example, the metadata can include information about the recipients of the recorded content. Other metadata can include the title of the broadcast, e.g., a title entered by the user of the mobile device recording the content, the location of the mobile device, for example, in latitude and longitude, the orientation of the device, and date and time information. According to embodiments, the device can initiate a broadcast first metadata, e.g., with or without a list of contacts that would receive the content. During the broadcast, the user can select to add or remove recipients. When this happens, device 102 can send update metadata that correspond to the user selection. According to embodiments, the data and/or the metadata are transmitted via a REST request to the selected server.

According to aspects of the disclosure, each chunk can have a number in sequential order with metadata. For example, when the first recording starts, a sequential number can be prepended to the name of the chunk, starting at digit "00000000000." This can then followed by incrementing the digits to the next number, e.g., "000000001" when a new chuck is generated. The mobile device can transmit the lower numbered chunks to the server before the higher numbered ones. If the server receives the chunks out of order, it can process the chunks, store them, and can wait for the lower numbered chunks to be processed so that the received chunks can be delivered in order.

According to aspects of the disclosure, the metadata can indicate which number in the sequence corresponds to the last chunk that the server should expect. Accordingly, the server can know when the final element has been received. For example, when the user ends their broadcast, a small REST request can be sent to the server to indicate that this session stops when a certain sequence number is received. In addition, metadata can be added to the data sent from the upload queue that can indicate to the server that the received chunk is the last chuck. The disclosed method can also provide checks that can inform the server that the broadcast is complete, even if the server has not received the final chunk of the recorded broadcast. This can be useful, for example, when the final chunk arrives at a later date, e.g., the next time the user opens the application on his cell phone or the mobile device is connected to a network. When the server receives the final chunk(s), it can append the final chunks to the ones already received.

According to aspects of the disclosure, the mobile device user may select to broadcast video and/or audio content that has already been recorded and is stored in the mobile device, for example in the mobile device's memory, or on media connected to the mobile device, for example, on an external hard drive 122. The method can determine whether the existing media will be segmented (124) before being uploaded into the upload queue, or whether the existing media will be uploaded in full 126.

Figure 5:
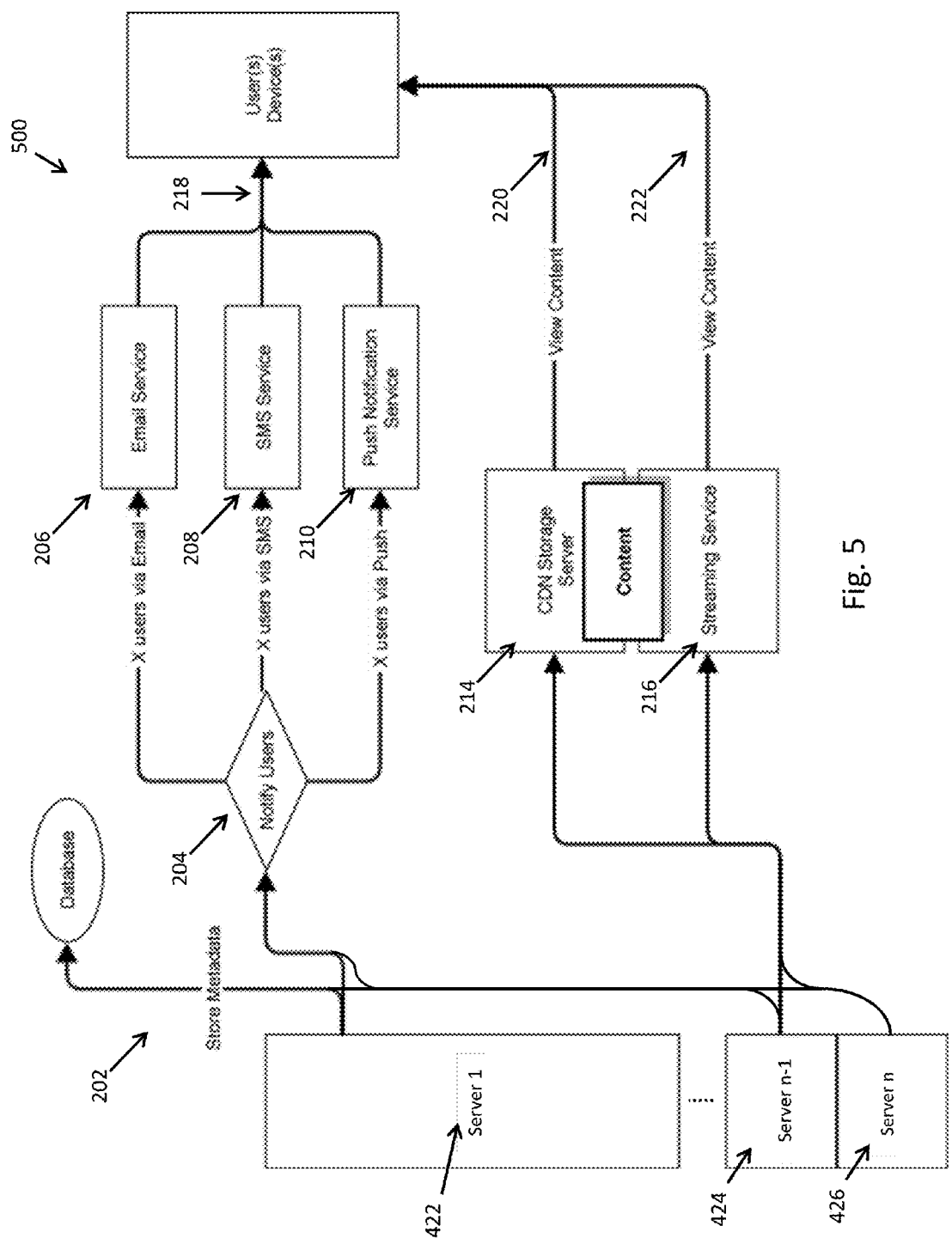
FIG. 5 shows an exemplary method for delivering broadcasted mobile video and audio content in a network with non-contiguous connection, according to aspects of the invention.

FIG. 5 shows an exemplary method 500 for delivering broadcasted mobile video and audio content to an audience, according to aspects of the invention. After the selected server, e.g., one of servers 422, 424, 426, receives the chunks from the mobile device, it can store the metadata of each chunk into a database 202. The server can also notify users, e.g., recipients specified in the metadata, that content is available 204. For example, the server can use an email service 206, an SMS service 208, or a Push notification service 210 to alert the user of new content. The server can also store the content into a content delivery network (CDN) storage server 214 or a streaming service 216. Once the user receives a notification that content is available 218, the user can request access to the content. The recipient mobile device can receive the content from either the CDN storage server 220 or the steaming service 222.

According to aspects of the disclosure, the server can reconstruct the recording from its chunks before it is delivered or streamed to a target mobile device. Alternatively, the content can be delivered or streamed to the target mobile device(s) as chunks.

According to aspects of the disclosure, the chunks can be transmitted to the server before the user, e.g., content creator, finishes recording of the content. Therefore, the recipient(s) can start receiving chunks from the CDN storage server or can stream the content from the streaming service even before the final chunk arrives at the server. As the chunks come into the server, the method can detect the rate at which they come in, and accordingly deliver them to the target mobile device to achieve reduced latency. Therefore, a broadcast can continue for hours and the end user can watch as it is happening. According to embodiments, the recipient can start viewing the content before the broadcast to finishes.

Figure 6C:
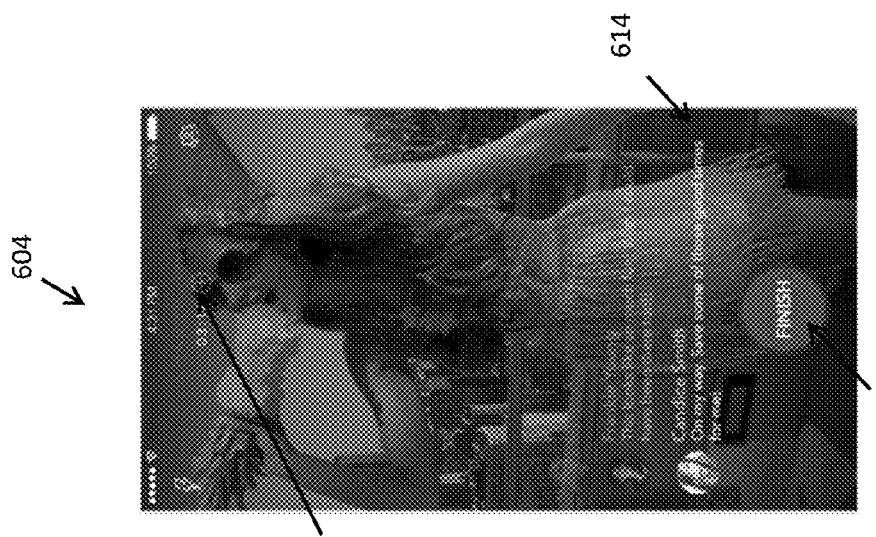
FIGS. 6A-6C show exemplary screenshots that illustrate embodiments of the disclosed methods and systems, according to aspects of the invention.
Figure 6B:
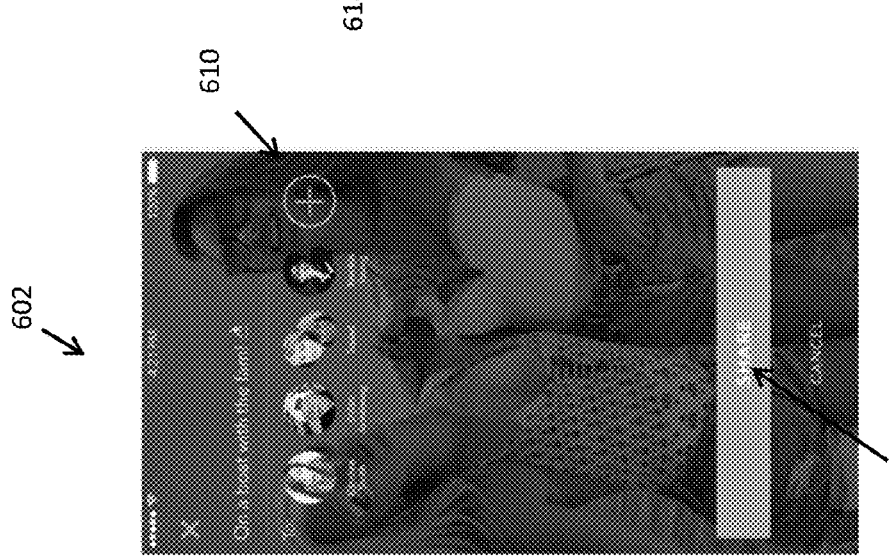
Figure 6A:
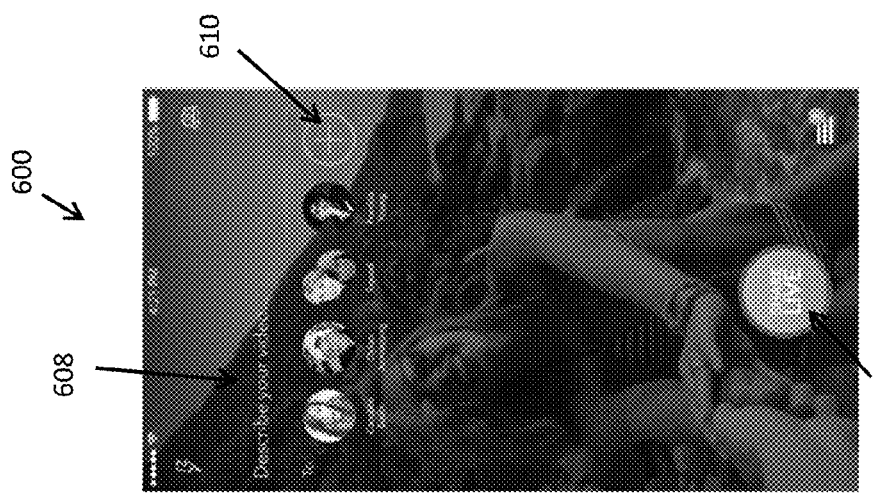

FIGS. 6A-6C illustrate exemplary screenshots of a method implemented on a mobile device according to aspects of the disclosure. FIG. 6A shows a screenshot 600 of an application running on a mobile device. The application implementing an exemplary method disclosed herein, enables a user to start preparing for a broadcast of media content, e.g., video or audio, for example, by pressing an indicator 606. For example, the application allows the user to enter a title for the broadcast 608 and/or select one or more recipients of the broadcast 610. Once the user has set up the broadcast, the broadcast can begin, for example, by pressing another indicator 612, as illustrated in screenshot 602 of FIG. 6B. FIG. 6C illustrates an exemplary screenshot 604, of an application during a broadcast. The application allows the recipients to respond to the received content, e.g., by displaying messages on the screen 614. The application further allows the user to add or remove recipients during the broadcast, for example, by pressing an indicator (618), which can pull up the list of active recipients or a list of stored contacts. The application also allows the user to stop the broadcast, e.g., by pressing indicator 616.

The invention claimed is:

1. A method for broadcasting media content comprising:
   recording, by a mobile device, the media content;
   monitoring, by the mobile device, the recording of the media content to determine whether a threshold has been reached;
   segmenting, by the mobile device, the recorded content into at least one chunk, when the threshold has been reached;
   encoding, by the mobile device, the at least one chunk, upon a determination to encode the at least one chunk;
   compressing, by the mobile device, the at least one chunk;
   placing, by the mobile device, the at least one compressed chunk into an upload queue;
   transmitting, by the mobile device, to a server the at least one chunk from the upload queue;
   receiving, by the mobile device, from the server a confirmation that the at least one transmitted chunk has been successfully received by the server; and
   deleting the at least one transmitted chunk from the mobile device, after receiving the confirmation from the server;
   wherein the threshold can dynamically change during the recording of the media content.

2. The method of claim 1, further comprising:
   transmitting, by the mobile device, to the server first metadata associated with the at least one chunk;
   wherein the first metadata includes at least one of a list of recipients for the media content, a title for the media content, a location associated with the media content, time information, and date information.

3. The method of claim 2, further comprising:
   transmitting, by the mobile device, to the server second metadata associated with the at least one chunk;
   wherein the second metadata includes at least one change in the list of recipients.

4. The method of claim 1, wherein the threshold is at least one of a media content size and a duration.

5. The method of claim 1, further comprising selecting the server from a plurality of servers, based on the proximity of the server to the mobile device.

6. The method of claim 1, wherein the confirmation from the server comprises a successful REpresentational State Transfer ("REST") Header response.

7. The method of claim 1, wherein the at least one chunk is encoded with a Fast Forward Moving Picture Experts Group (MPEG) encoder.

8. A method for broadcasting media content comprising:
   recording, by a mobile device, the media content;
   monitoring, by the mobile device, the recording of the media content to determine whether a threshold has been reached;
   segmenting, by the mobile device, the recorded content into at least one chunk, when the threshold has been reached;
   encoding, by the mobile device, the at least one chunk, upon a determination to encode the at least one chunk;
   compressing, by the mobile device, the at least one chunk;
   placing, by the mobile device, the at least one compressed chunk into an upload queue;
   transmitting, by the mobile device, to a server the at least one chunk from the upload queue;
   receiving, by the mobile device, from the server a confirmation that the at least one transmitted chunk has been successfully received by the server;
   deleting the at least one transmitted chunk from the mobile device, after receiving the confirmation from the server; and
   selecting the server from a plurality of servers, based on the proximity of the server to the mobile device.

9. The method of claim 8, further comprising:
   transmitting, by the mobile device, to the server first metadata associated with the at least one chunk;
   wherein the first metadata includes at least one of a list of recipients for the media content, a title for the media content, a location associated with the media content, time information, and date information.

10. The method of claim 9, further comprising:
    transmitting, by the mobile device, to the server second metadata associated with the at least one chunk;
    wherein the second metadata includes at least one change in the list of recipients.

11. The method of claim 8, wherein the threshold is at least one of a media content size and a duration.

12. The method of claim 8, wherein the threshold can dynamically change during the recording of the media content.

13. The method of claim 8, wherein the confirmation from the server comprises a successful REpresentational State Transfer ("REST") Header response.

14. The method of claim 8, wherein the at least one chunk is encoded with a Fast Forward Moving Picture Experts Group (MPEG) encoder.

15. A method for broadcasting media content comprising:
    recording, by a mobile device, the media content;
    monitoring, by the mobile device, the recording of the media content to determine whether a threshold has been reached;
    segmenting, by the mobile device, the recorded content into at least one chunk, when the threshold has been reached;
    encoding, by the mobile device, the at least one chunk, upon a determination to encode the at least one chunk;

compressing, by the mobile device, the at least one chunk;
placing, by the mobile device, the at least one compressed chunk into an upload queue;
transmitting, by the mobile device, to a server the at least one chunk from the upload queue;
receiving, by the mobile device, from the server a confirmation that the at least one transmitted chunk has been successfully received by the server;
deleting the at least one transmitted chunk from the mobile device, after receiving the confirmation from the server;
transmitting, by the mobile device, to the server first metadata associated with the at least one chunk; and
transmitting, by the mobile device, to the server second metadata associated with the at least one chunk;
wherein the first metadata includes at least one of a list of recipients for the media content, a title for the media content, a location associated with the media content, time information, and date information;
wherein the second metadata includes at least one change in the list of recipients.

16. The method of claim 15, wherein the threshold is at least one of a media content size and a duration.

17. The method of claim 15, wherein the threshold can dynamically change during the recording of the media content.

18. The method of claim 15, further comprising selecting the server from a plurality of servers, based on the proximity of the server to the mobile device.

19. The method of claim 15, wherein the confirmation from the server comprises a successful REpresentational State Transfer ("REST") Header response.

20. The method of claim 15, wherein the at least one chunk is encoded with a Fast Forward Moving Picture Experts Group (MPEG) encoder.

* * * * *